(12) United States Patent  (10) Patent No.: US 9,164,824 B2
Harada et al.  (45) Date of Patent: Oct. 20, 2015

(54) INFORMATION PROCESSING APPARATUS AND OPERATION STATUS MONITORING METHOD

(71) Applicant: FUJITSU LIMITED, Kawasaki (JP)

(72) Inventors: Tsunemichi Harada, Machida (JP); Hiroaki Sato, Yokohama (JP); Akira Sampei, Kawasaki (JP); Fumio Hanzawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 247 days.

(21) Appl. No.: 13/658,926

(22) Filed: Oct. 24, 2012

(65) Prior Publication Data

US 2013/0159773 A1  Jun. 20, 2013

(30) Foreign Application Priority Data

Dec. 20, 2011  (JP) ................................. 2011-279030

(51) Int. Cl.
*G06F 11/00* (2006.01)
*G06F 11/07* (2006.01)
*G06F 11/30* (2006.01)

(52) U.S. Cl.
CPC .......... *G06F 11/076* (2013.01); *G06F 11/0727* (2013.01); *G06F 11/0784* (2013.01); *G06F 11/3006* (2013.01); *G06F 11/3034* (2013.01);
(Continued)

(58) Field of Classification Search
CPC ............ G06F 11/3006; G06F 11/3055; G06F 11/3065
USPC ...................................... 714/55, 56
See application file for complete search history.

(56) References Cited

U.S. PATENT DOCUMENTS 5,390,326 A * 2/1995 Shah ............................ 370/222
5,907,670 A * 5/1999 Lee ................................ 714/4.1
6,766,470 B1 * 7/2004 Shah ............................. 714/4.2
(Continued)

FOREIGN PATENT DOCUMENTS

JP  8-329023 A  12/1996
JP  11-249931  9/1999
(Continued)

OTHER PUBLICATIONS

Extended European Search Report mailed by EPO and corresponding to European application No. 12190347.0 on Mar. 26, 2013.
(Continued)

*Primary Examiner* — Joshua Lohn
(74) *Attorney, Agent, or Firm* — Fujitsu Patent Center

(57) ABSTRACT

An information processing apparatus includes a plurality of controller modules capable of performing communications with each other, and a memory included in each controller module to be stored with status information reflecting a status of an error occurring during the communications with other controller modules with respect to the controller module of a communication partner apparatus and/or the controller module of the self-apparatus, wherein, when determining whether or not a fault occurs in a certain controller module in the plurality of controller modules, the controller module different from a determination target controller module determines, based on status information of the determination target controller module that is stored on the memories of two or more controller modules different from the determination target controller module, whether the fault occurs in the determination target controller module.

12 Claims, 13 Drawing Sheets

(52) U.S. Cl.
CPC ........ *G06F 11/3055* (2013.01); *G06F 11/3065* (2013.01)

(56) References Cited

U.S. PATENT DOCUMENTS

| | | | |
|---|---|---|---|
| 7,694,179 B2* | 4/2010 | Sato et al. | 714/25 |
| 7,870,425 B2* | 1/2011 | Moore et al. | 714/13 |
| 7,877,627 B1* | 1/2011 | Freydel | 714/11 |
| 2003/0093727 A1* | 5/2003 | Belschner et al. | 714/56 |
| 2007/0076593 A1 | 4/2007 | Sakurai et al. | |
| 2009/0040934 A1* | 2/2009 | Matsubara et al. | 370/242 |
| 2010/0211258 A1 | 8/2010 | Sakurai et al. | |
| 2011/0055375 A1* | 3/2011 | Heim et al. | 709/224 |

FOREIGN PATENT DOCUMENTS

| | | |
|---|---|---|
| JP | 2001-007892 | 1/2001 |
| JP | 2007-126127 A | 5/2007 |
| JP | 2007-249741 | 9/2007 |

OTHER PUBLICATIONS

Japanese Office Action mailed May 12, 2015 for corresponding Japanese Patent Application No. 2011-279030, with Partial English Translation, 7 pages.

* cited by examiner

FIG. 5

| | 0x00 | 0x01 | 0x02 | 0x03 | 0x04 | 0x05 | 0x06 | 0x07 |
|---|---|---|---|---|---|---|---|---|
| 0x0000 | CM#0 | CM#1 | CM#2 | CM#3 | CM#4 | CM#5 | CM#6 | CM#7 |
| 0x0010 | CM#0DMA0 | CM#0DMA1 | CM#0DMA2 | CM#0DMA3 | CM#1DMA0 | CM#1DMA1 | CM#1DMA2 | CM#1DMA3 |
| 0x0020 | CM#2DMA0 | CM#2DMA1 | CM#2DMA2 | CM#2DMA3 | CM#3DMA0 | CM#3DMA1 | CM#3DMA2 | CM#3DMA3 |
| 0x0030 | CM#4DMA0 | CM#4DMA1 | CM#4DMA2 | CM#4DMA3 | CM#5DMA0 | CM#5DMA1 | CM#5DMA2 | CM#5DMA3 |
| 0x0040 | CM#6DMA0 | CM#6DMA1 | CM#6DMA2 | CM#6DMA3 | CM#7DMA0 | CM#7DMA1 | CM#7DMA2 | CM#7DMA3 |

| | OTHER CM | OTHER DMA PORT | SELF-DMA PORT | SELF-CM |
|---|---|---|---|---|
| CM TIMEOUT (BETWEEN CMs) | 3 | 8 | 0 | 0 |
| CM TIMEOUT (BETWEEN CPUs) | 0 | 0 | 0 | 8 |
| ABNORMALITY IN COMMUNICATION (SELF SYSTEM SIDE) | 0 | 0 | 16 | 12 |
| ABNORMALITY IN COMMUNICATION (OPPOSITE SYSTEM SIDE) | 12 | 16 | 0 | 0 |
| ABNORMALITY IN COMMUNICATION (SUSPICIOUS PORTION UNKNOWN) | 6 | 8 | 8 | 6 |

INFORMATION PROCESSING APPARATUS AND OPERATION STATUS MONITORING METHOD

CROSS-REFERENCE TO RELATED APPLICATION

This application is based upon and claims the benefit of priority of the prior Japanese Patent Application No. 2011-279030, filed on Dec. 20, 2011, the entire contents of which are incorporated herein by reference.

FIELD

The present invention relates to an information processing apparatus including a plurality of controller modules capable of performing communications with each other and to an operation status monitoring method of monitoring operation statuses of a plurality of controller modules capable of performing the communications with each other.

BACKGROUND

In the information processing apparatuses, there exist some apparatuses each including the plurality of controller modules capable of performing the communications with each other, in which if a certain controller module gets into a fault, the operation continues by detaching this controller module from other portions. This type of information processing apparatus is configured so that normally one module (the controller module or a status monitoring module) determines (decides) which component (a controller module, a circuit in the controller module, etc) gets into the fault. In the apparatus in which one module determines whether each component gets into fault or not, however, if this module falls into the fault, such situations occur that "the actually normal component is erroneously determined to have the fault and is then detached" and "the apparatus does not normally function because the failure component is not detached". Therefore, such an information processing apparatus (which will hereinafter be referred to as a conventional apparatus) has been developed that each of the plurality of controller modules monitors a status of each component, and a specified controller module determines, based on the monitoring results of the whole controller modules, which component is the failure component.

DOCUMENTS OF PRIOR ARTS

Patent document 1: Japanese Patent Laid-Open Publication No. 2007-249741
Patent document 2: Japanese Patent Laid-Open Publication No. 11-249931
Patent document 3: Japanese Patent Laid-Open Publication No. 2001-7892

The conventional apparatus described above is an apparatus in which the controller module (which will hereinafter be termed a sender module) failing in communications with a master controller module solely determines whether a specified controller module (which will hereinafter be referred to as a master controller module) gets into the fault or not. Namely, the conventional apparatus is the apparatus in which even when the failure in communicating with the master controller module is caused by the fault on the side of the sender module and if the sender module cannot recognize this fault, the master controller module is erroneously determined to have the fault and is then detached.

SUMMARY

According to one aspect of a technology of the disclosure, an information processing apparatus includes a plurality of controller modules capable of performing communications with each other, and a memory included in each controller module to be stored with status information reflecting a status of an error occurring during the communications with other controller modules with respect to the controller module of a communication partner apparatus and/or the controller module of the self-apparatus. Moreover, when determining whether or not a fault occurs in a certain controller module in the plurality of controller modules, the controller module different from a determination target controller module determines, based on status information of the determination target controller module that is stored on the memories of two or more controller modules different from the determination target controller module, whether the fault occurs in the determination target controller module.

Further, an operation status monitoring method according to another aspect of the technology of the disclosure is an method for monitoring operation statuses of a plurality of controller modules capable of performing communications with each other. The operation status monitoring method comprises storing, into a memory included in each controller module, status information reflecting a status of an error occurring during the communications with other controller modules with respect to the controller module of a communication partner apparatus and/or the controller module of the self-apparatus, and when determining whether or not a fault occurs in a certain controller module in the plurality of controller modules, determining, by the controller module different from a determination target controller module, based on status information of the determination target controller module that is stored on the memories of two or more controller modules different from the determination target controller module, whether the fault occurs in the determination target controller module.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is an explanatory diagram of a status value table equipped in each CM;

FIG. 6 is an explanatory diagram of point added information retained by each CM;

DESCRIPTION OF EMBODIMENTS

In-depth descriptions of embodiments of the present invention will hereinafter be made with reference to the drawings. Note that each of first and second embodiments, which will hereinafter be described, is nothing but one example of the present invention, and the present invention can be realized also in such a form that specific configurations and procedures are different from those in the respective embodiment.

First Embodiment

Figure 1:
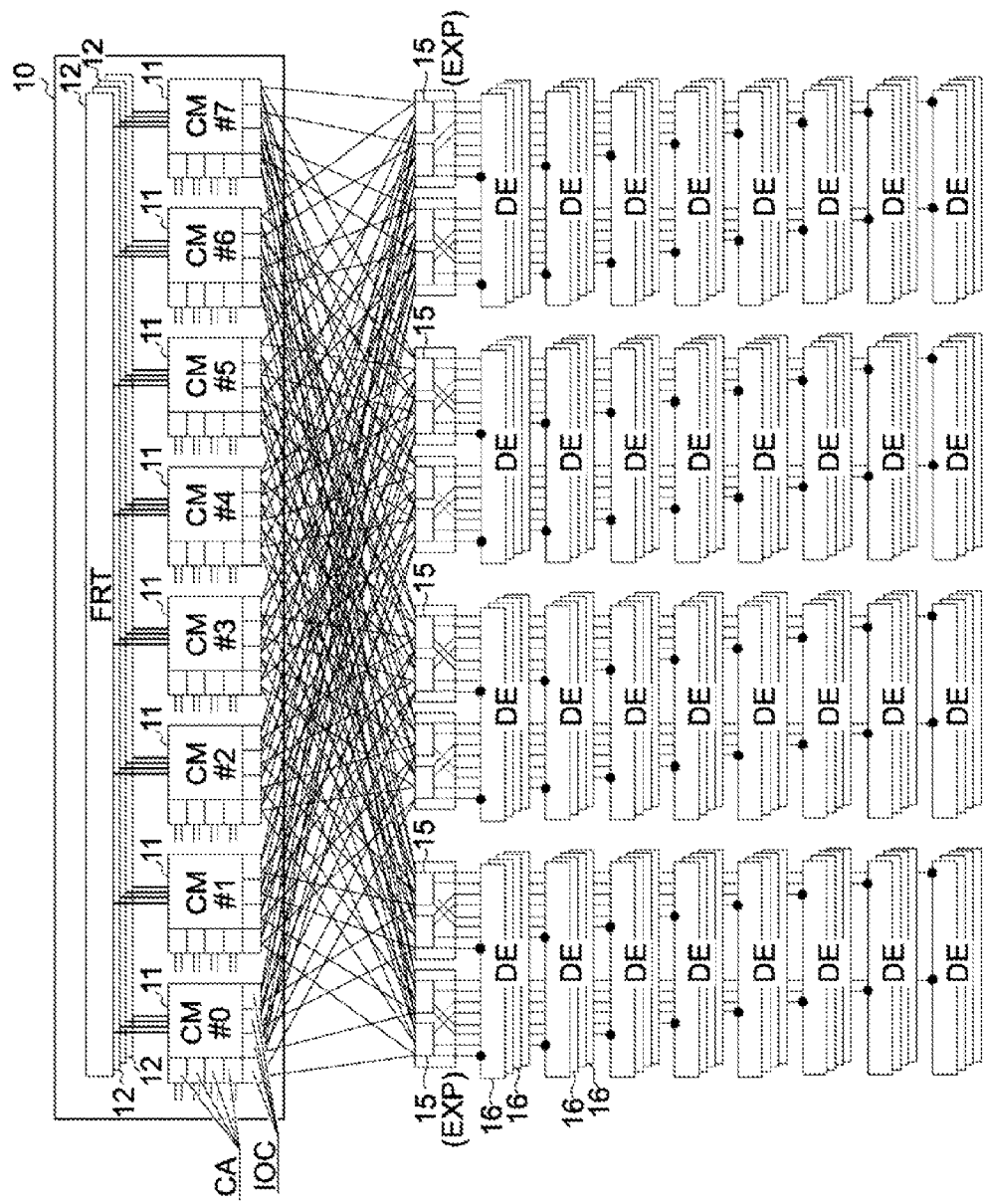
FIG. 1 is an explanatory diagram of an example of a configuration of a storage system built up by use of an information processing apparatus according to a first embodiment.
Figure 2:
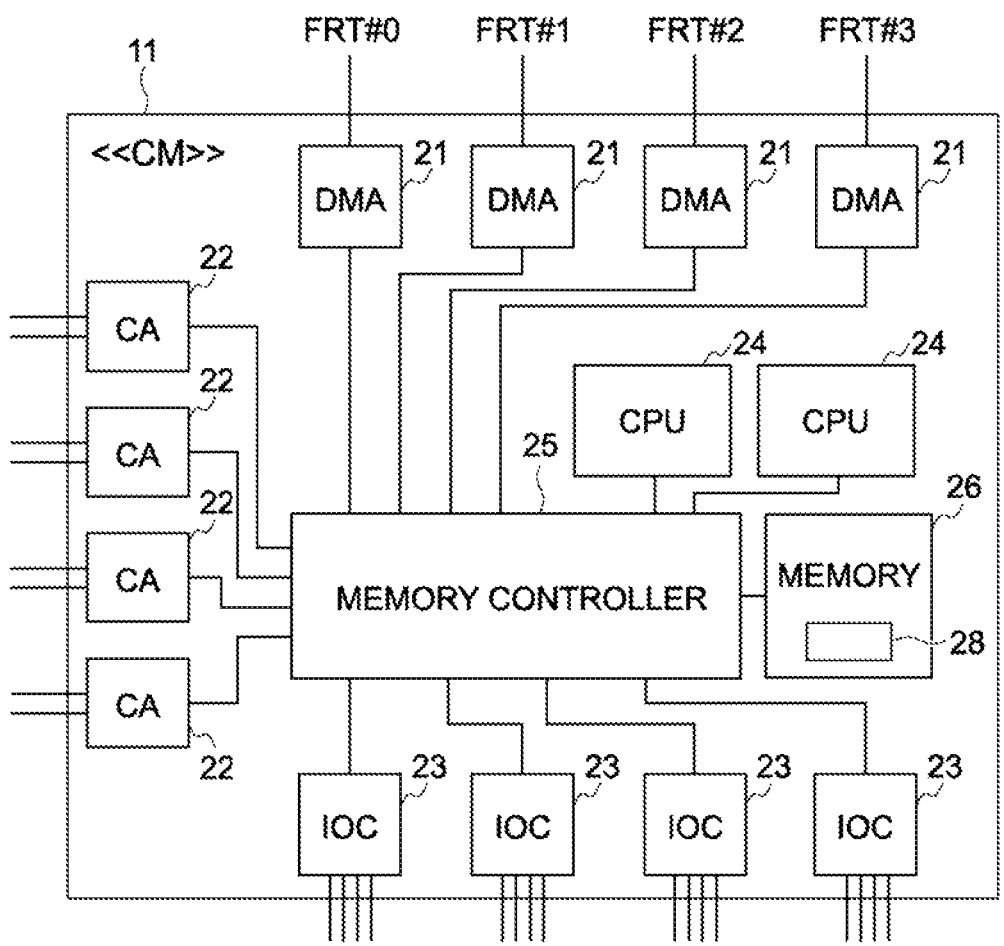
FIG. 2 is a schematic diagram of a configuration of a CM equipped in the information processing apparatus according to the first embodiment.

To start with, a usage mode of an information processing apparatus 10, a hardware configuration thereof and basic operations (functions) thereof according to a first embodiment will be described by use of FIGS. 1 and 2. Incidentally, FIG. 1 is an explanatory diagram of an example of architecture of a storage system built up by use of the information processing apparatus 10. Further, FIG. 2 is a schematic diagram of a configuration of each of CMs (Controller Modules) 11 with which the information processing apparatus 10 is equipped.

The information processing apparatus 10 according to the first embodiment is an apparatus for building up the storage system as illustrated in FIG. 1.

Each of DEs (Drive Enclosures) 16 in this storage system is a unit configured to mount a plurality (equal to or less than a specified number) of drives into a body unit capable being mounted with up to a specified number of drives (hard disk drives or solid-state drives). Each of EXPs (expanders) 15 is a multi-port switch (which is a SAS (Serial Attached SCSI (Small Computer System Interface) in the first embodiment) for establishing a connection between the CM 11 and the DE 16. When building up the storage system, normally the EXPs 15, of which the number and a specification (a number of ports) enable the respective CMs 11 within the information processing apparatus 10 to be connected to an arbitrary number of (whole) DEs 16, are provided between the information processing apparatus 10 and the plurality of DEs 16.

The information processing apparatus 10 is an apparatus which makes all the drives within the storage system (with the plurality of DEs 16 connected to the information processing apparatus 10 itself via the plurality of EXPs 15) function as a plurality of RAIDs (Redundant Array of Independent (or Inexpensive) Disks).

As depicted in FIG. 1, the information processing apparatus 10 include 8 pieces of CMs 11 and 4 pieces of FRTs (Front-end Routers) 12. Note that FIG. 1 illustrates the 8 pieces of CMs 11, however, the information processing apparatus 10 is the apparatus to and from which the CMs 11 are attachable and detachable as well as being the apparatus that can be operated in the form of being mounted with only a less number of CMs 11 than "8". The respective CMs 11 in the information processing apparatus 10 will hereinafter be also notated such as CM#n (n=0 through 7). Further, the respective FRTs 12 in the information processing apparatus 10 will hereinafter be also notated such as FRT#m (m=0 through 3).

Each of the CMs 11 in the information processing apparatus 10 is a module that receives a read/write request with respect to each RAID (an arbitrary RAID) from a host (unillustrated), and has a read/write access, having a content corresponding to the received read/write request, to each RAID. Note that the read/write request received by each CM 11 is, precisely, not "the read/write request with respect to a certain RAID" but "the read/write request with respect to a certain logical volume allocated to any one the RAIDs".

As illustrated in FIG. 2, the CM 11 includes four DMA (Direct Memory Access) ports ("DMA" in FIG. 2) 21, four CAs (Channel Adapters) 22 and four IOCs (Input/Output Controllers) 23. The CM 11 further includes two CPUs (Central Processing Units) 24, a memory controller 25 and a memory 26. The CM 11 still further includes a ROM (Read Only Memory; unillustrated) stored with an IPL (Initial Program Loader) etc, and a cache memory (unillustrated).

Each CA 22 is an interface unit for performing communications with the host. The CM 11 is, when realized, used as a controller module performing the communications based on protocols such as an FC (Fibre Channel) protocol, an iSCSI (Internet Small Computer System Interface) protocol and an SAS protocol. Furthermore, the host utilizing the storage system is used as a host normally including a plurality of interface adapters for performing the communications with the storage system (the information processing apparatus 10). Then, a connection between each of CAs 22 in the respective CMs 11 and each server is established directly or via a switch (an FC switch, a LAN (Local Area Network) switch, a SAS switch) so as to enable each of the interface adapters of the host to perform the communications with the different CM 11.

The IOC 23 is an interface controller (which is a SAS controller in the first embodiment) for the DE 16. Each of the IOCs 23 within the CM 11 is normally, as illustrated in FIG. 1, connected to all the DEs 15 via the plurality of EXPs 15 (the eight expanders in the first embodiment).

The DMA port 21 (FIG. 2) is an interface unit for the communications between the CMs 11. Each DMA port 21 in the CM 11 is connected to the FRT 12 (any one of the FRT#0 FRT#3) defined as the multi-port switch. The DMA ports 21 connected to FRT#m (m=0 through 3) will hereinafter be referred to also as DMA ports #m.

Note that the information processing apparatus 10 is the apparatus configured to, when a certain CM 11 gets into a fault and is separated from other portions (the use of this CM 11 is stopped), hand over the process being executed by this fault CM 11 to another CM 11. In other words, the information processing apparatus 10 is the apparatus in which each CM 11 (the CPU 24 in each CM 11) comparatively frequently notifies another CM 11 of information on a content of the process being executed by the CM 11 itself, and notification of this information involves making use of each DMA port 21.

Further, the CM 11 is configured (programmed) to periodically execute a process of checking whether statuses of other CMs 11 are normal or not by trying the communications. This process also involves making use of each DMA port 21.

The memory 26 is a DRAM (Dynamic Random Access Memory) employed as a storage area of a program read by the CPU 24 from the system disk according the IPL on the ROM, a working area of this program, a storage area (which will be descried in detail later on) of a status value table 28, etc. Note that the system disk connotes a specified RAID stored with the program read onto the memory 26 and executed by the CPU 24 within the storage system.

The memory controller 25 is a unit that controls the memory 26 and controls the connection between the respective units (between the memory 26 and the DMA port 21, and so on) within the CM 11.

The operations (functions) of the information processing apparatus 10 according to the first embodiment will hereinafter be specifically described. Note that the information processing apparatus 10 according to the first embodiment is particularly characteristic in a procedure of determining whether or not a master CM (its details will be described later on). Therefore, the following discussion on the operations of the information processing apparatus 10 will be made by focusing on the operations related to the determining procedure.

Figure 3:
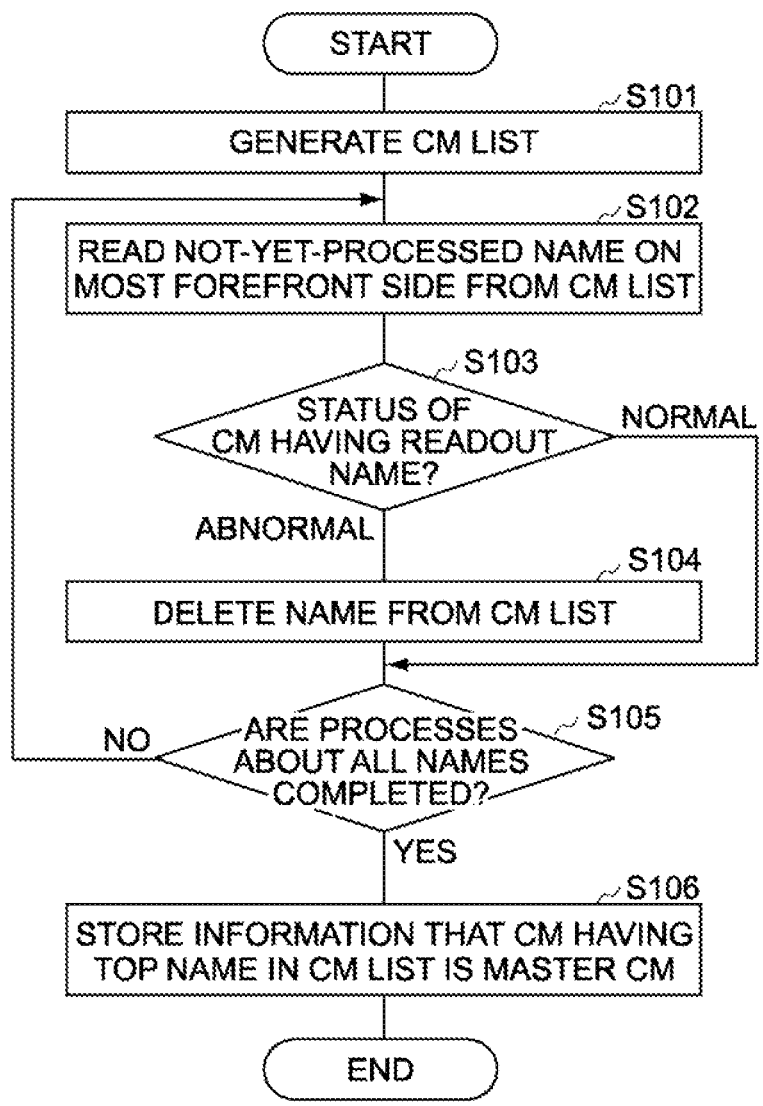
FIG. 3 is a flowchart of a master CM specifying process executed by each CM.

Each of the CMs 11 in the information processing apparatus 10, upon being started, executes a master CM specifying process of the procedure illustrated in FIG. 3.

To be specific, the CM 11 starting the master CM specifying process because of being started, at first, generates a CM list as a list in which names (identifying information) of all the CMs 11 are arranged in the sequence of priority levels from the highest (step S101). Herein, "the list (i.e., the CM list) in which the names of all the CMs 11 are arranged in the sequence of the priority levels from the highest" connotes "the list in which the names of all the CMs 11 are arranged so that the name of the CM 11 having a higher priority level is positioned on a more forefront side". Further, the priority levels of the respective CMs 11 connote the priority levels allocated beforehand to the individual CMs 11 for the purpose of enabling the master CM (and the next master CM) to be determined.

The CM 11, which has finished generating the CM list, reads a not-yet-processed name (a not-yet-read name) on the most forefront side from the generated CM list (step S102). Subsequently, the CM 11 checks a status of the CM 11 having the readout name through the communications making use of the DMA port 21 (step S103). Then, the CM 11, if the checked status of the CM 11 is abnormal (off-line etc) (step S103; abnormal), deletes the name of this CM 11 from the CM list (step S104), and thereafter executes a process (determination) in step S105. Further, the CM 11, whereas if the checked status of the CM 11 is normal (step S103; normal), executes the process in step S105 without carrying out the process in step S104.

In step S105, the CM 11 determines whether the processes with respect to all the names in the CM list are completed or not (whether or not the name processed this time is the last name in the CM list). Then, the CM 11, if the processes with respect to all the names in the CM list are not completed (step S105; NO), executes again the processes from step S102 onward.

The CM 11, if the processes with respect to all the names in the CM list are completed (step S105; YES), gets stored with information that the CM 11 having the top name in the CM list at that point of time is defined as the master CM (step S106). Then, the CM 11 finishes the master CM specifying process (the processes in FIG. 3).

Each CM 11 finishing the master CM specifying process starts the operation as the master CM if this CM 11 itself is the master CM but starts the operation as a slave CM whereas if not the master CM.

Each CM 11 operating as the slave CM (the CM 11 starting the operation as the slave CM) will hereinafter be referred to as the slave CM, and the CM 11 operating as the master CM will be referred to as the master CM.

Already described, each CM 11 (the master CM or the slave CM) in the information processing apparatus 10 comparatively frequently notifies another CM 11 of the information on the content of the process being executed by the CM 11 itself by use of the DMA port 21. Moreover, each CM 11 periodically executes the process of checking whether or not the communications with another CM 11 by making use of the DMA port 21.

Figure 4:
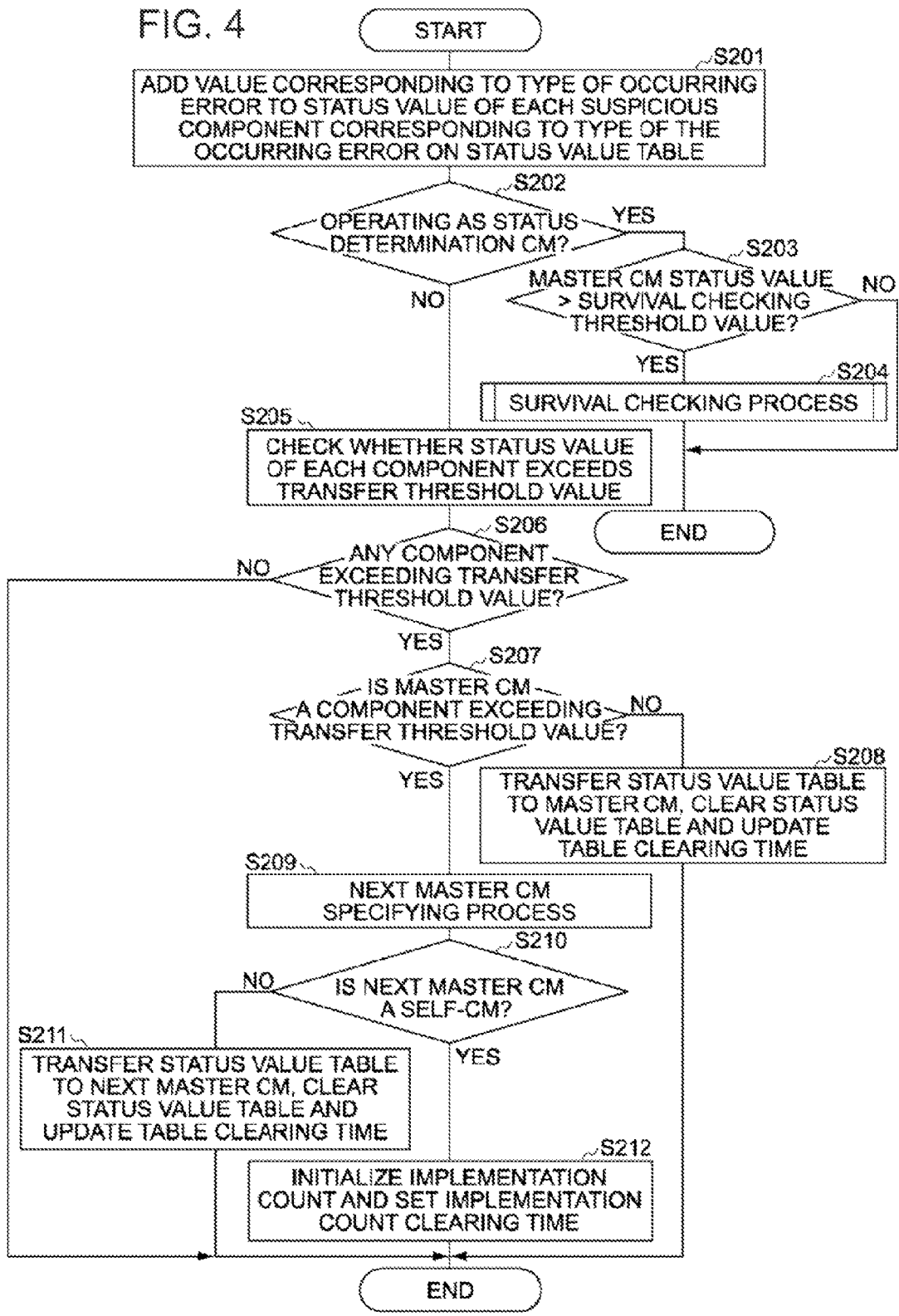
FIG. 4 is a flowchart of an error process for a slave CM that is executed by each slave CM when a communication error occurs.

The slave CM, if a communication error occurs during the communications such as this, executes an error process for the slave CM in the procedure illustrated in FIG. 4.

Namely, if the communication error occurs during the communications with another CM 11, the slave CM, to begin with, adds a value corresponding to the occurring error to a status value of each suspicious component (a component having a possibility of being broken) corresponding to a type of the occurring error on a status value table 28 (step S201).

Herein, the status value table 28 connotes a table capable of getting stored with a status value concerning each CM 11 and a status value concerning each DMA port 21 in the CM 11. Further, the status value concerning a certain component (the CM 11, the DMA port 21) is a value representing a status where the error occurs and is an added value of predetermined points corresponding to the type of the occurring error.

This status value is managed by each individual CM 11. Moreover, a probability (a degree of certainty; status value/threshold value) that the component gets into the fault can be obtained from this status value.

Note that an initial value of the status value in the status value table is "0", and this value is updated when the error occurs. Further, the status value is also initialized to "0" by power OFF/ON of the information processing apparatus 10 and by restarting the CM 11.

The content of the process in step S201 will hereinafter be described more specifically by use of FIGS. 5 and 6.

Each CM 11 (slave CM/master CM) employs a specified area on the memory 26 in the self-CM 11 as the status value table 28 in the form depicted in FIG. 5. Note that a 1-byte storage area marked with "CM#n" (n=0 through 7) is an area stored with the status value of "CM#n" in FIG. 5. Furthermore, a 1-byte storage area marked with "CM#nDMAm" (n=0 through 7, m=0 through 3) is an area stored with a status value of the DMA port #m within the CM#n.

Moreover, each CM 11 has a function of distinctively determining which type of error occurs (the communication error occurs during the communications with another CM 11) among the following five types of errors.

CM timeout (between the CMs): Communication timeout between the two CMs 11;

CM timeout (between the CPUs): Communication timeout between the two CPUs 24 within the same CM 11;

Communication abnormality (on the self-system side): Communication abnormality with an apparent problem existing on the self-CM 11 side other than the communication timeout;

Communication abnormality (on an opposite system side): Communication abnormality with the apparent problem existing on the another CM 11 (the communication partner) side other than the communication timeout; and Communication abnormality (suspicious portion unknown): Communication abnormality unknown about which side, the self-CM 11 side or another CM 11 side, the problem exists on.

Further, each CM 11 retains the point added information having a content illustrated in FIG. 6, i.e., the point added information in which the values (points) to be added to the status values of the respective components are predetermined on a type-by-type basis of the occurring errors. Then, the process in step S201 is a process of adding, based on the point added information, the value (the points in the point added information) corresponding to the occurring error to the status value of each suspicious component that corresponds to the type of the occurring error.

Note that "0" may or may not be added to the status value of the corresponding component of which the point is "0" in the point added information illustrated in FIG. 6.

Referring back to FIG. 4, the description of the error process for the slave CM will proceed.

The slave CM finishing the process in step S201 determines whether or not the slave CM itself operates as a status determining CM that determines a status of the master CM and performs detaching (step S202). Though the details will be described later on, the slave CM operating as the status determining CM as the case may be is only a specified slave CM (which the next master CM that will be explained later on). Further, the specified slave CM (the next master CM) operates only when becoming a specified status. Accordingly, the slave CM normally executes the process in step S205 after the process (determination) in step S202.

In step S205, the slave CM checks whether or not the status value exceeds a transfer threshold value with respect to each status value with its value being updated in the process of step S201. Herein, the transfer threshold value connotes a value that is predetermined so as to become a larger value (which is normally twice or three times as large as the maximum value of the points in the point added information) than the majority of the points in the point added information (FIG. 6).

The process in this step S205 is a process of varying the transfer threshold value depending on the number of the normal CMs 11 (which will hereinafter be referred to as a CM count) in the information processing apparatus 10. Concretely, the process in step S204 is the process executed on the assumption that the transfer threshold value="48" if a relation "CM count ≥4" is established and also executed on the assumption that the transfer threshold value="32" whereas if the relation "CM count ≥4" is not established.

The slave CM finishing the process in step S205, if there is no component of which the status value exceeds the transfer threshold value (which will hereinafter be termed an excess-over-the-transfer-threshold-value component) (step S206; NO), terminates the error process for the slave CM (the processes in FIG. 4).

Whereas if there exist one or more excess-over-the-transfer-threshold-value components (step S206; YES), the slave CM determines whether or not the master CM is the excess-over-the-transfer-threshold-value component (any one of the excess-over-the-transfer-threshold-value components is the master CM) (step S207).

If the master CM is not the excess-over-the-transfer-threshold-value component (step S207; NO), the slave CM transfers the status value table 28 (the whole status values in the status value table 28) to the master CM in step S208.

Thereafter, the slave CM executes a process of clearing the status value table 28 and a process of updating table clear time to "present time+specified time (e.g., 1 min)". Herein, the phrase "clearing the status value table 28" implies that the respective status values in the status value table 28 are rewritten with "0". Moreover, the table clear time indicates the time when the slave CM clears the status value table 28 when reach this table clear time.

The slave CM finishes the error process for the slave CM after executing the process in step S208.

Herein, the operation of the master CM is to be explained before describing the contents of the remaining steps in the error process for the slave CM.

Figure 7:
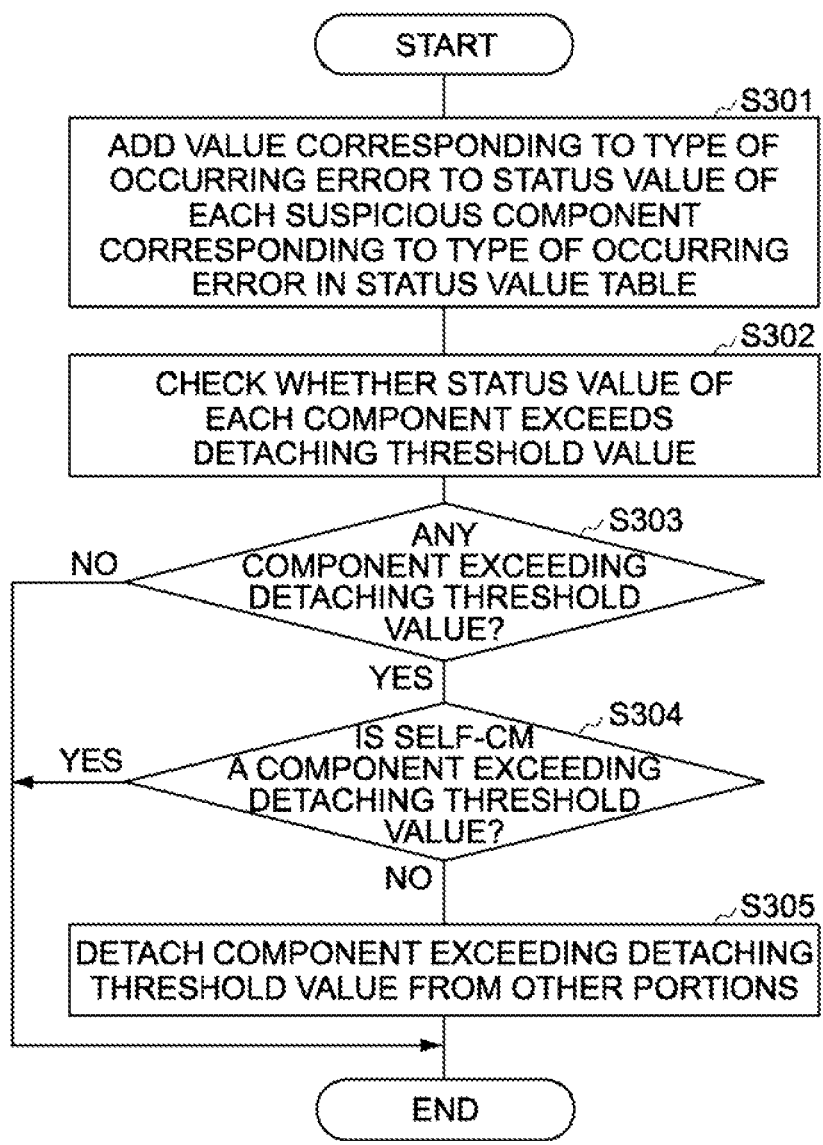
FIG. 7 is a flowchart of an error process for a master CM that is executed by the master CM when the communication error occurs.

The master CM executes an error process for the master CM in a procedure depicted in FIG. 7 if the communication error occurs during the communications with another CM 11.

Namely, if the communication error occurs during the communications with another CM 11, the master CM carries out a process (step S301) of adding the value corresponding to the occurring error to the status value of each suspicious component corresponding to the type of the occurring error in the status value table 28 on the memory 26 of the master CM itself. This process is a process having the same content as that of the process in step S201 explained by use of FIGS. 5 and 6.

Subsequently, the master CM checks whether or not the status value exceeds a detaching threshold value with respect to each of the status values in the status value table 28 (step S302). Herein, the detaching threshold value represents a value that is predetermined so as to become a larger value (which is several times as large as the transfer threshold value; e.g., 128) than the transfer threshold value (32 or 48 in the first embodiment).

The master CM finishing the process in step S302 determines whether or not there exists the component of which the status value exceeds the detaching threshold value (which will hereinafter be termed an excess-over-the-detaching-threshold-value component) (step S303). Then, the master CM, if there exists no excess-over-the-detaching-threshold-value component (step S303; NO), terminates this error process for the master CM.

Whereas if there exist one or more excess-over-the-detaching-threshold-value components (step S303; YES), the master CM determines whether or not the master CM itself is the excess-over-the-detaching-threshold-value component (any one of the excess-over-the-detaching-threshold-value components is the self-CM 11) (step S304).

If the master CM itself is not the excess-over-the-detaching-threshold-value component (step S304; NO), the master CM performs a process of detaching each excess-over-the-detaching-threshold-value component from other portions in step S305. To be specific, in step S305, the master CM executes a process of shifting the status of each CM (a program in each CM 11) to a status of not using each excess-over-the-detaching-threshold-value component, a process of notifying the host of the detached CM 11, and so on. Then, the master CM finishing the process in step S305 terminates the error process for the master CM.

Whereas if the master CM itself is the excess-over-the-detaching-threshold-value component (step S304; YES), the master CM terminates this error process for the master CM without detaching the master CM itself from other portions.

Figure 8:
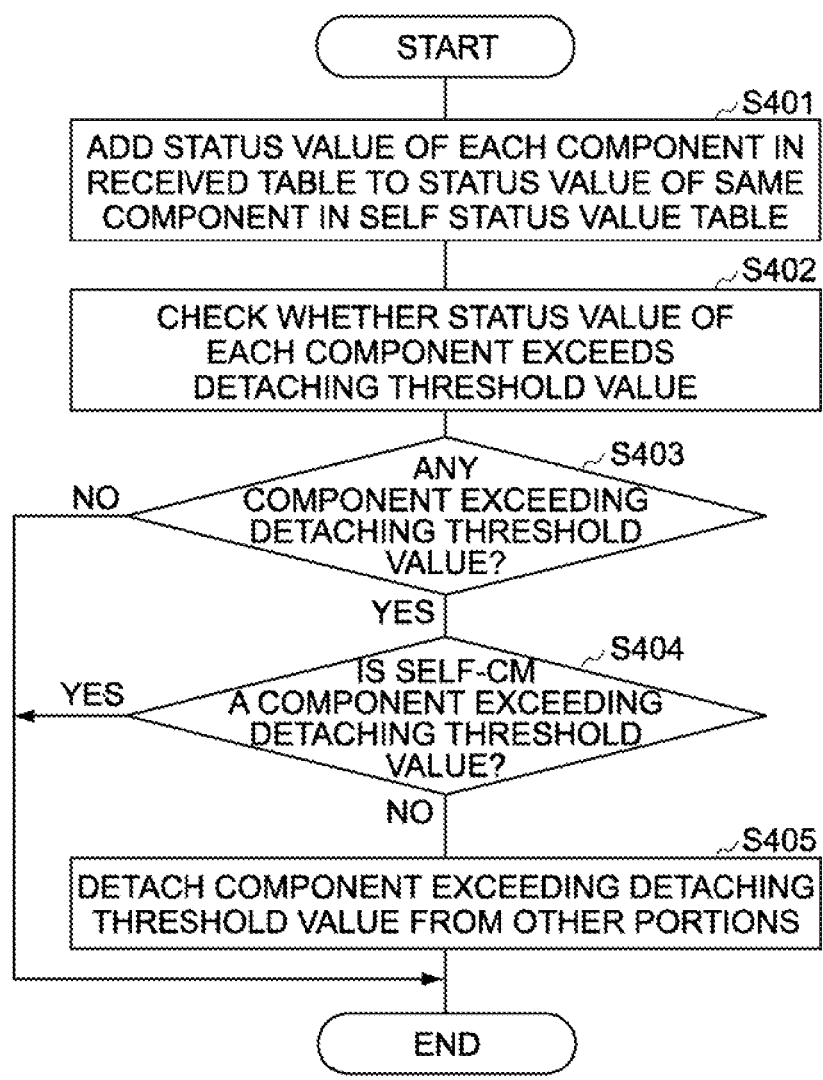
FIG. 8 is a flowchart of a process for when receiving the table that is executed by the master CM when receiving the status value table.

Moreover, as already described (see FIG. 4), the slave CM, if a predetermined condition is satisfied, transfers the status value table 28 to the master CM. When receiving the status value table 28 from the slave CM, the master CM executes a process for when receiving the table in a procedure illustrated in FIG. 8.

That is, the master CM receiving the status value table 28, at first, adds the status value of each of the components in the received status value table 28 to the status value of the same component in the status value table 28 of the master CM itself (step S401).

Thereafter, the master CM, after executing the processes (step S402 through step S405) having absolutely the same contents as those of the processes in step S302 through step S305 in the error process for the master CM (FIG. 7), terminates the process for when receiving the table.

The master CM executes, in addition to the processes described above, a process of clearing the status value table 28 within the self-CM 11 on a per specified time basis.

Referring back to FIG. 4, the description of the error process for the slave CM will proceed.

The slave CM, if the master CM is the excess-over-the-transfer-threshold-value component (step S207; YES), conducts a next master CM specifying process in step S209.

This next master CM specifying process is a process of searching for the normal CM 11 having the highest priority level from within the CMs 11 excluding the master CM in the same procedure as that of the next master CM specifying process (FIG. 3), and specifying the searched CM 11 as the next master CM (storing the information that the searched CM 11 is the next master CM).

The slave CM finishing the next master CM specifying process determines whether the slave CM itself is the next master CM (step S210). Then, the slave CM, if the slave CM itself is not the next master CM (step S210; NO), transfers at first the status value table 28 to the next master CM in step S211. Subsequently, the slave CM, after executing the process of clearing the status value table 28 and the process of updating the table clear time to "present time+specified time", finishes the process in step S211 and the error process for the slave CM (the processes in FIG. 4).

Whereas if the slave CM itself is the next master CM (step S210; YES), the slave CM further executes, in step S212, a process of initializing a survival checking implementation count to "0" and setting "present time+specified time" at implementation count clearing time. Moreover, the slave CM also carries out a process of storing the information that the slave CM starts operating as the status determination CM (storing the information that the slave CM operates as the status determination CM). Note that the survival checking implementation count is a variable for storing an execution count within the specified time in a survival checking process (FIG. 10) that will be described later on. Furthermore, the implementation count clearing time is the time for the status determination CM (the next slave CM operating as the status determination CM) to clear the status value table 28 and start the operation as the normal slave CM.

The slave CM (the next master CM starting the operation as the status determination CM; this CM will hereinafter be simply termed also the status determination CM) finishing the process in step S212 terminates this error process for the slave CM.

The status determination CM (the next master CM operating as the status determination CM) also, if the communication error occurs during the communications with another CM 11, starts this error process for the slave CM. Then, the status determination CM, after executing the process in step S201, executes not the process in step S205 but the process (determination) in step S203 because of this CM itself operating as the status determination CM (step S202; YES).

In step S203, the status determination CM determines whether or not the status value of the master CM in the status value table 28 in the self-CM 11 exceeds a predetermined survival checking threshold value (e.g., 96).

Then, the status determination CM, if the status value of the master CM exceeds the survival checking threshold value (step S203; YES), executes a survival checking process (an in-depth description thereof will be made later on) and thereafter terminates the error process for the slave CM. Furthermore, the status determination CM, whereas if the status value of the master CM is equal to or smaller than the survival checking threshold value (step S203; NO), finishes the error process for the slave CM without executing the survival checking process.

As already described (see FIG. 4), the slave CM not being the next master CM, if the master CM is the excess-over-the-transfer-threshold-value component (step S201; NO), transfers the status value table 28 to the next master CM (step S211).

Figure 9:
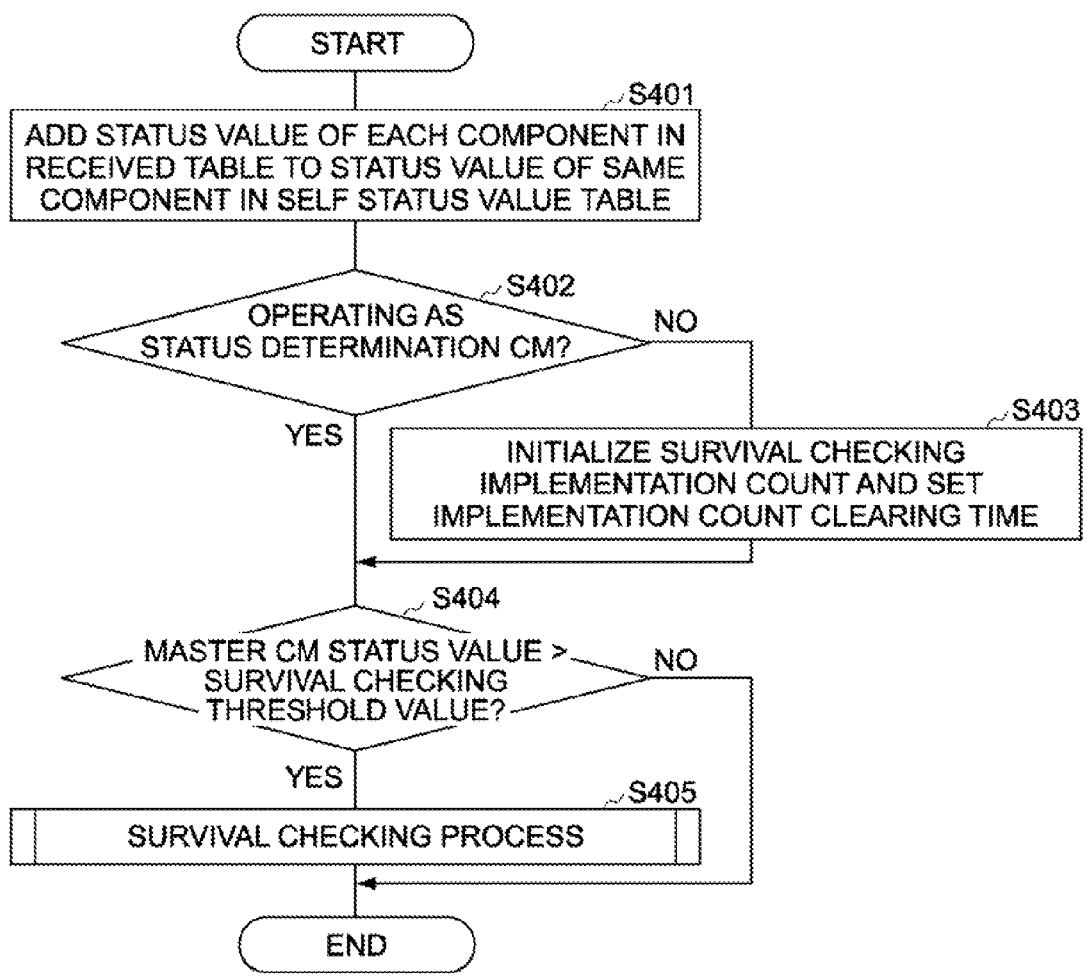
FIG. 9 is a flowchart of the process for when receiving the table that is executed by a next master CM when receiving the status value table.

The next master CM, when receiving the status value table 28, executes the process for when receiving the table in a procedure illustrated in FIG. 9.

Namely, the next master CM, when receiving the status value table 28, at first adds the status value of each component in the received status value table 28 to the status value of the same component in the status value table 28 within the self-CM (step S501).

Subsequently, the next master CM determines whether the CM operates as the status determination CM or not (step S502). Then, the next master CM, if not operating as the status determination CM (step S502; NO), performs the same process as the process in step S212 (FIG. 4) in step S503. That is, the next master CM initializes the survival checking implementation count to "0" and sets "present time+specified time" at the implementation count clearing time in step S503. Further, the next master CM stores the information that the operation as the status determination CM is started.

The next master CM finishing the process in step S503 determines whether or not the status value of the master CM exceeds the survival checking threshold value (step S504). Further, the next master CM, if operating already as the status determination CM (step S502; YES), executes the process (determination) in step S504 without carrying out the process in step S503.

Then, the status determination CM (the next master CM operating as the status determination CM), if the status value of the master CM does not exceed the survival checking threshold value (step S504; NO), terminates this process for when receiving the table. Further, the status determination CM, whereas if the status value of the master CM exceeds the survival checking threshold value (step S504; YES), executes the survival checking process in step S505 and thereafter finishes the process for when receiving the table.

Figure 10:
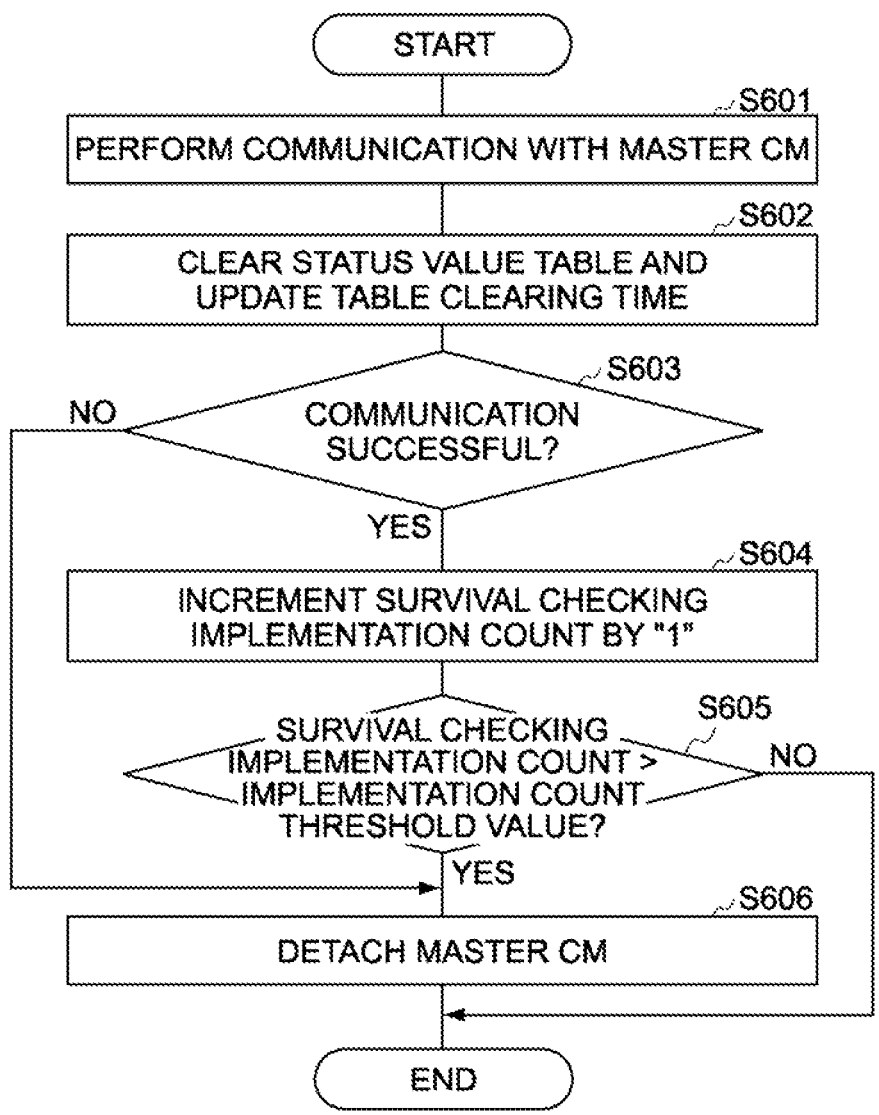
FIG. 10 is a flowchart of a survival checking process executed by the next master CM.

The survival checking process executed in step S505 (FIG. 9) and in step S204 (FIG. 4) is the process in the procedure illustrated in FIG. 10.

To be specific, the status value of the master CM exceeds the survival checking threshold value, and hence the status determination CM starting this survival checking process implements (trials), at first, the communications with the master CM (step S601). Moreover, the status determination CM also executes a process of clearing the status value table 28 and updating table clearing time to "present time+specified time" (step S602).

The status determination CM finishing the processes in step S601 and in step S602, if succeeding in the communications with the master CM in step S601 (step S603; YES), adds "1" to the survival checking implementation count (step S604). Thereafter, the status determination CM determines whether or not the survival checking implementation count with its value being updated exceeds a predetermined implementation count threshold value (e.g., "3") (step S605).

If the survival checking implementation count exceeds the implementation count threshold value (step S605; YES), the status determination CM executes a process (such as a process of notifying each CM 11 that the configuration is changed) for detaching the master CM from other portions. Then, the status determination CM terminates this survival checking process.

Whereas if the survival checking implementation count does not exceed the implementation count threshold value (step S605; NO), the status determination CM terminates this survival checking process without detaching the master CM from other portions.

Further, if failing in the communications with the master CM in step S601 (step S603; NO), the status determination CM detaches the master CM from other portions without checking the value of the survival checking implementation count (step S606). Then, the status determination CM finishes this survival checking process.

The operation of the information processing apparatus according to the first embodiment will hereinafter be described more specifically.

To start with, the operation of the information processing apparatus 10 in the case of the slave CM getting into the fault will be described by exemplifying an instance where the CM#3 (the slave CM) gets into the fault in such a status that the CM#0 is the master CM.

Figure 11:
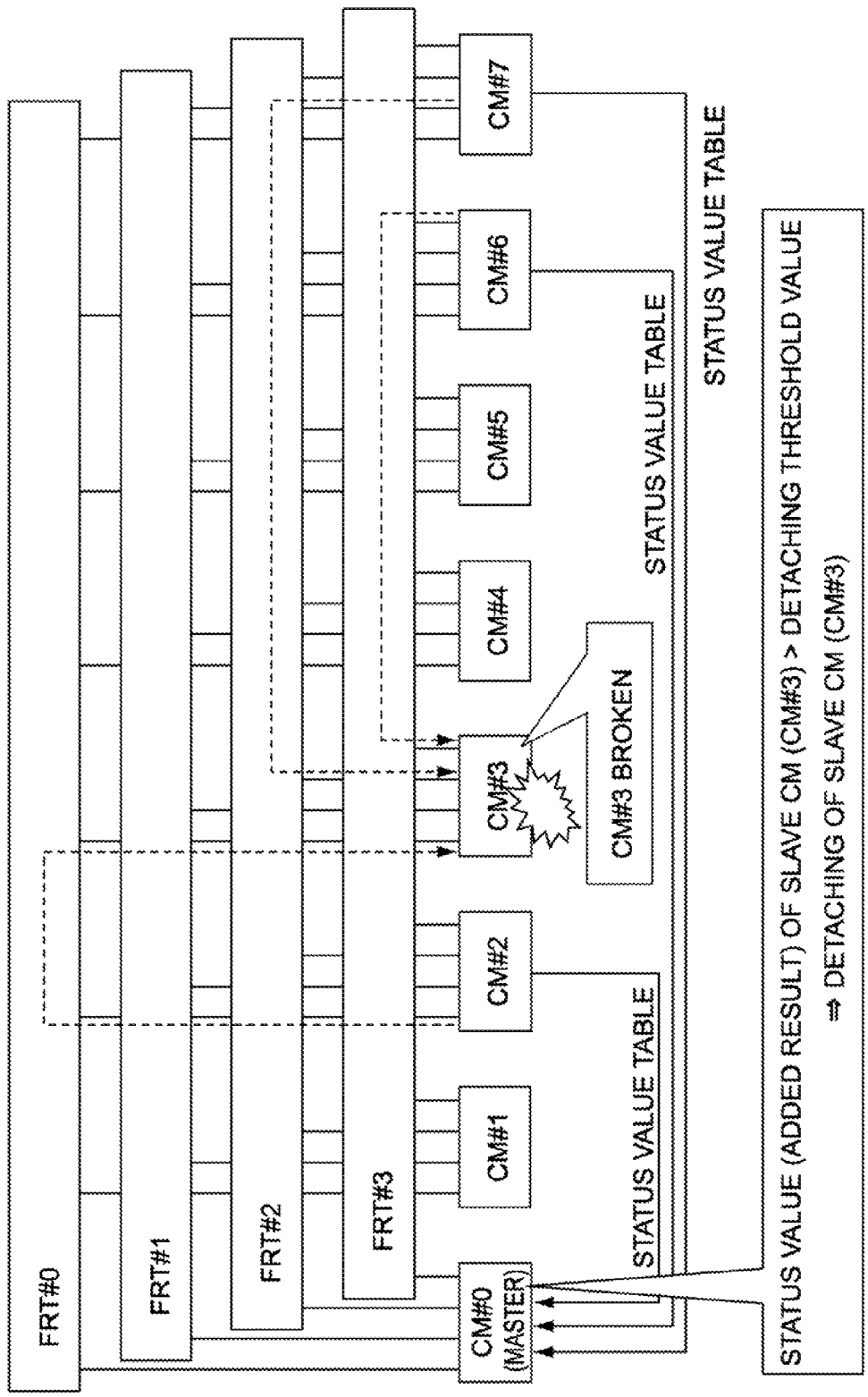
FIG. 11 is an explanatory diagram of a content of an operation of the information processing apparatus according to the first embodiment in a case where the slave CM falls into a fault.

In this case, as schematically illustrated in FIG. 11, it follows that the communication error occurs during the communications (indicated by arrows of broken lines) with CM#3 from each of the CMs 11 (CM#2, CM#6, CM#7 in FIG. 11).

Therefore, for example, the CM#2 performs the communication with the CM#3 via the DMA port #0, in which case the CM#2 executes the error process for the slave CM (FIG. 4). Then, as a result of executing the process in step S201, it follows that "3" and "8" (see FIG. 6) are added to the status value related to the CM#3 and the status value related to the DMA port #0 of the CM#3 in the status value table 28 within the CM#2.

The CM#2 is the CM 11 (the CM 11 not being the next master CM) not operating as the status determination CM. Therefore, the processing diverts to the side of "NO" in step S202 executed after the process in step S201. Then, any status value with its value being updated does not exceed the transfer threshold value (step S206; NO), and hence the error process for the slave CM is finished without transferring the status value table 28 to the master CM.

The CM#2 failing in the communications with the CM#3 tries the communications with CM#3 by changing the DMA port 21 used for the communications with the CM#3 to, e.g., the DMA port #1. If the CM#3 gets into the fault, the error occurs also during this communication, so that the CM#2 executes again the error process for the slave CM. As a result, the process in step S201 is carried out, and "3" and "8" are added respectively to the status value related to the CM#3 and the status value related to the DMA port #1 of the CM#3 in the status value table 28 within the CM#2.

The CM#2 required to perform the communications with the CM#3 repeats the processes described above. Accordingly, the status value of the CM#3 exceeds the transfer threshold value in a comparatively short period of time (before the status value table 28 is cleared as the specified time elapses). Then, as a result, it follows that the status value table 28 in the CM#2 is transferred to the master CM (CM#0).

Other CMs 11 (CM#6 and CM#7 in FIG. 11), which have tried the communications with the CM#3, execute the error process for the slave CM each time the communication error occurs. Therefore, it follows that the status value table 28 in each CM 11 is transferred to the master CM (CM#0).

On the other hand, the master CM (CM#0), whenever receiving the status value table 28, starts the process for when receiving the table (FIG. 8) and adds the status value of each component in the received status value table 28 to each status value in the status value table 28 of the master CM itself (step S401). Accordingly, when receiving the status value tables 28 several times, the status value related to the CM#3 in the status value table 28 of the master CM (CM#0) exceeds the detaching threshold value. Then, as a consequence (step S403; YES), it follows that the CM#3 is detached.

Next, the operation of the information processing apparatus 10 in the case of the master CM getting into the fault will be described by exemplifying a case where the CM#0 is the master CM, and the CM#1 is the next master CM.

Figure 12:
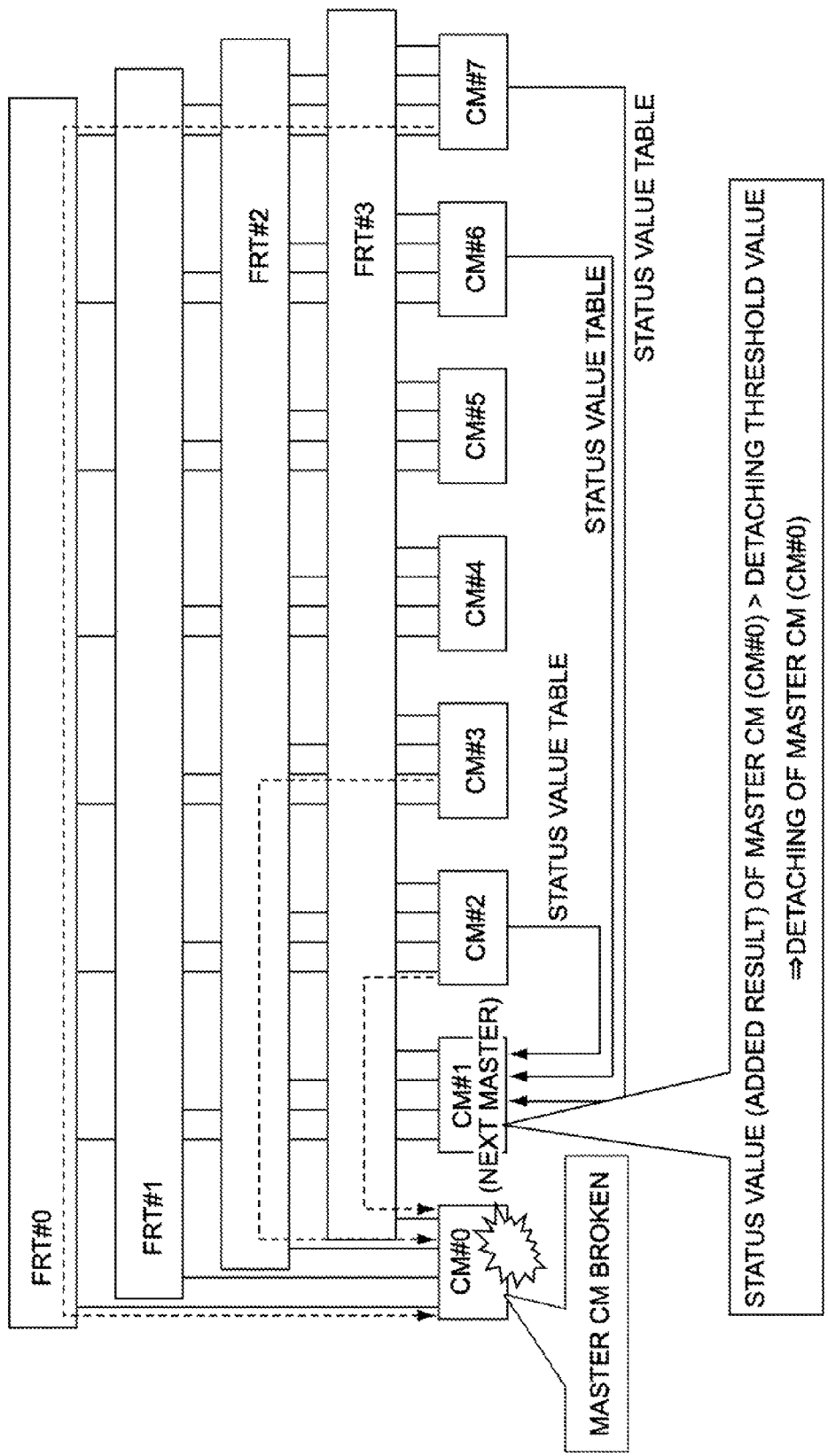
FIG. 12 is an explanatory diagram of a content of an operation of the information processing apparatus according to the first embodiment in a case where the master CM falls into the fault.

In this case, as schematically illustrated in FIG. 12, the communication error occurs during the communications (indicated by the arrows of the broken lines) flowing from the respective CMs 11 (CM#2, CM#6, CM#7 in FIG. 12) to the master CM (CM#0).

Then, each of the CMs 11 (CM#2, CM#6, CM#7) detecting the occurrence of the communication error iterates "the process of trying the communications with the master CM (CM#0) by changing the DMA port 21 used for the communications after executing the error process for the slave CM". Therefore, the status value related to the master CM (CM#0) in the status value table 28 within each CM 11 exceeds the transfer threshold value in the comparatively short period of time.

If the status value related to the master CM (CM#0) exceeds the transfer threshold value (step S207; YES), the slave CM not being the next master CM transfers the status value table 28 to the next master CM (CM#1) (step S211).

The next master CM, whenever receiving the status value table 28, starts the process for when receiving the table (FIG. 9) and adds the status value of each component in the received status value table 28 to each status value in the status value table 28 of the next master CM itself (step S501). Accordingly, when receiving the status value tables 28 several times, it follows that the status value pertaining to the master CM (CM#0) in the status value table 28 within the next master CM (CM#1) exceeds the survival checking threshold value.

If the status value pertaining to the master CM (CM#0) exceeds the survival checking threshold value, the next master CM executes the survival checking process (FIG. 10). As already explained, the survival checking process is the process of detaching the master CM from other portions if it can be confirmed from the communications with the master CM that the master CM gets into the fault and if the implementation count of the survival checking process within the specified time exceeds the implementation count threshold value.

Accordingly, if the master CM (CM#0) actually gets into the fault, it follows that the master CM is detached from other portions when the survival checking process is executed some which time.

As described in detail so far, the information processing apparatus 10 according to the first embodiment is the apparatus that executes, when the following condition is established, the survival checking process defined as the process of detaching the master CM if determined to be the fault in the case of determining whether the master CM gets into the fault or not.

This condition is that the status value related to the master CM in the status value table 28 exceeds the survival checking threshold value due to the additions of the respective status values in the received status value table 28.

Then, this condition is the condition that is not established normally if one slave CM erroneously determines that the master CM gets into the fault. Accordingly, the information processing apparatus 10 according to the first embodiment can be said to be the apparatus capable of determining more accurately whether the master CM is detached or not than by the conventional apparatus in which one slave CM determines whether the master CM is detached or not.

Second Embodiment

An information processing apparatus according to a second embodiment of the present invention is an apparatus into which the information processing apparatus 10 according to the first embodiment discussed above is improved software-wise. Hence, the following discussion will be focused on different portions in terms of the operation of the information processing apparatus 10 according to the second embodiment from those of the information processing apparatus 10 according to the first embodiment in a way that uses the same reference numerals as those employed for explaining the information processing apparatus 10 in the first embodiment. Further, in the following discussion, the CM 11 within the information processing apparatus 10 according to the first embodiment is referred to as a class 1 CM 11, while the CM 11 within the information processing apparatus 10 according to the second embodiment is referred to as a class 2 CM 11.

The class 2 CM 11 is a module different from the class 1 CM 11 with respect to only a content of the operation as the status determination CM.

Concretely, if being the slave CM, the error process for the slave CM, which is executed by the class 2 CM 11, has basically the same content as that of the error process for the slave CM (FIG. 4) described above. In step S211 (which is executed if the class 2 CM 11 is the next master CM) of the error process for the slave CM that is executed by the class 2 CM 11, however, there is also executed a process of initializing a reception count with respect to each of other class 2 CMs 11 (which will hereinafter be termed sender CMs).

Figure 13:
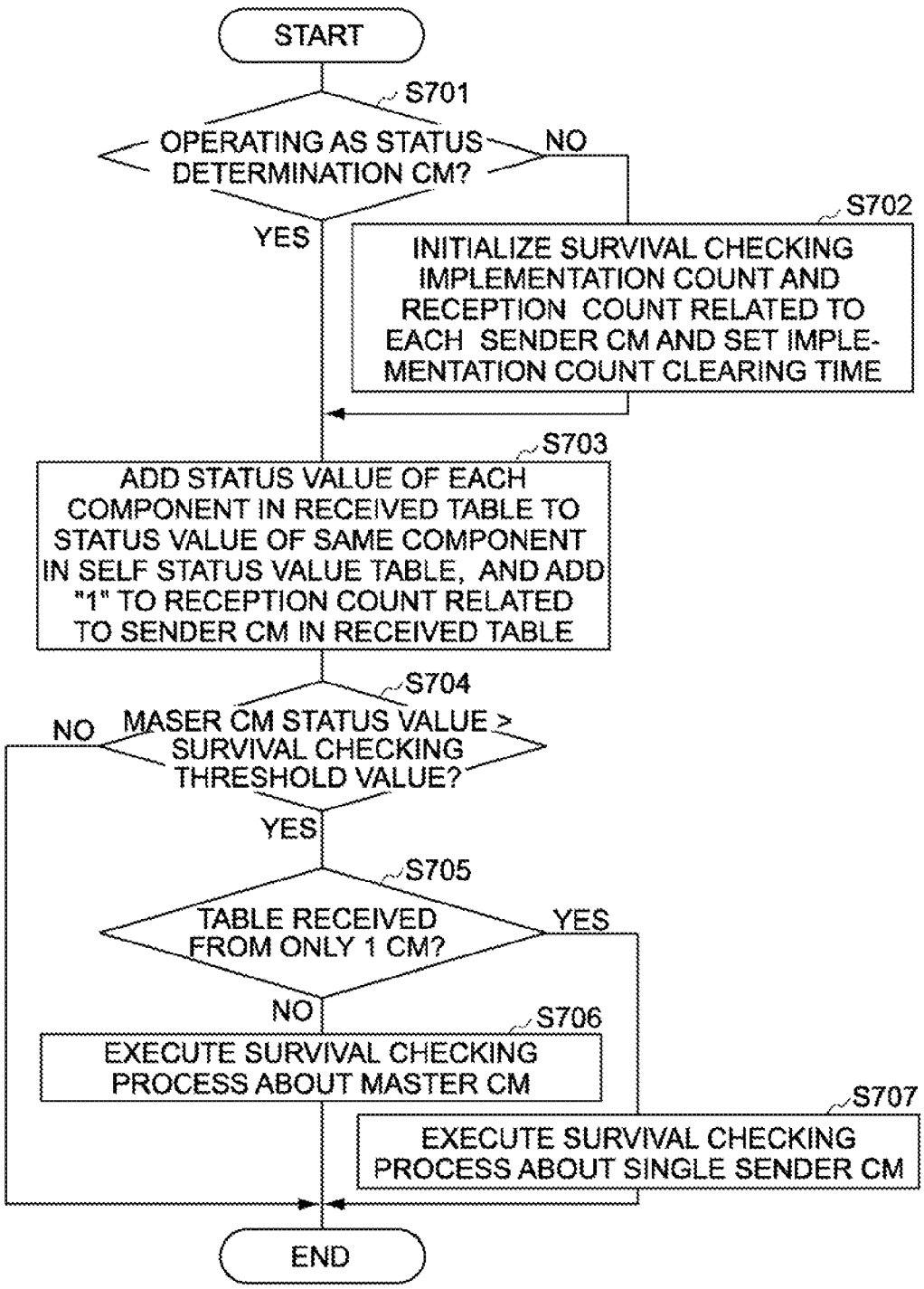
FIG. 13 is a flowchart of the process for when receiving the table, which is executed by the next master CM when receiving the status value table in the information processing apparatus according to a second embodiment.

Furthermore, the class 2 CM 11, if being the next master CM, executes processes in a procedure illustrated in FIG. 13 as the process for when receiving the table.

That is, the class 2 CM 11 serving as the next master CM (which will hereinafter be simply referred to as the next master CM) determines, in the case of receiving the status value table 28, whether the CM operates as the status determination CM or not (step S701). Then, the next master CM, if not operating as the status determination CM (step S701; NO), initializes the survival checking implementation count and the reception count related to each sender CM to "0" and sets "present time+specified time" at the implementation count clearing time in step S702. Further, the next master CM gets stored with the information that the CM starts the operation as the status determination CM.

The next master CM finishing the process in step S702 executes a process of adding the status value of each component in the received status value table 28 to the status value of the same component in the status value table 28 within the self-CM 11 in step S703. The next master CM also executes, in this step S703, a process of adding "1" to the reception count about the sender CM of the status value table 28 received this time.

Further, the next master CM, if already operating as the status determination CM (step S701; YES), executes a process in step S703 without carrying out the process in step S702.

The next master CM finishing the process in step S703 determines whether the status value of the master CM exceeds the survival checking threshold value or not (step S704).

Then, the next master CM, if the status value of the master CM exceeds the survival checking threshold value (step S704; YES), determines whether the sender CM of the status value tables 28 received so far is 1 CM or not (step S705). Namely, the next master CM determines whether or not only one reception count not being "0" exists in the reception count information related to the sender CM (step S705).

Then, the next master CM, if receiving the status value tables 28 from the plurality of sender CMs (step S705; NO), executes the survival checking process (FIG. 10) with respect to the master CM (step S706) and thereafter finishes this process for when receiving the table.

While on the other hand, if receiving the status value table 28 from only one CM (step S705; YES), the next master CM executes the survival checking process with respect to the single sender CM of the status value table 28 (step S707) and thereafter finishes this process for when receiving the table.

In short, as described in regard to the information processing apparatus 10 according to the first embodiment, the condition "the status value related to the master CM in the status value table 28 exceeds the detaching threshold value due to the additions of the respective status values in the received status value table 28" defined as the condition for starting the survival checking process is the condition that is not established normally if one slave CM erroneously determines that the master CM gets into the fault. A condition "the status value related to the master CM in the status value table 28 exceeds the detaching threshold value due to the additions of the respective status values in the received status value table 28" is not, however, the condition that cannot be established if one slave CM erroneously determines that the master CM gets into the fault.

Then, if the procedure described above is adopted, the master CM can be prevented from being detached erroneously due to an erroneous determination of one slave CM about the status of the master CM. Further, this also implies that the slave CM making the erroneous determination (i.e., the slave CM falling into the fault) is quickly (before the status value thereof exceeds the detaching threshold value) detached from other portions. Therefore, it is because each of the CMs 11 of the information processing apparatus 10 according to the second embodiment is configured to have the function described above.

Modified Example

The information processing apparatus 10 according to each of the embodiments discussed above can be modified in a variety of forms. For example, each information processing apparatus 10 can be modified into an apparatus in which the next master CM executes not the survival checking process (FIG. 10) but the "process of detaching the master CM" insteps S204, S706, etc. Further, each information processing apparatus 10 can be also modified into an apparatus in which only the status value of the master CM is transmitted to the next master CM in step S211 (FIG. 4).

Each information processing apparatus 10 can be also modified into an apparatus in which not the transfer threshold value but the detaching threshold value and the survival checking threshold value vary depending on the CM count. Moreover, the information processing apparatus 10 according to each of the embodiments discussed above is the apparatus for the storage system (RAID system), however, the technology described above can be applied to the apparatuses if including the plurality of detachable units. Accordingly, an apparatus having no relation to the storage can be also realized based on the technology described above.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus, comprising:
    a plurality of controller modules capable of performing communications with each other,
    wherein each of the plurality of controller modules has a memory to store status information with respect to communication partner controller modules in the plurality of controller modules and/or a self controller module, determines an error type when an error occurs during the communications with the communication partner controller modules, and counts a value predetermined to update the status information corresponding to the determined error type, and
    a controller module in the plurality of controller modules, the controller module being different from a determination target controller module in the plurality of controller modules and determining whether or not a fault occurs in any controller module in the plurality of controller modules, determines, based on status information about the determination target controller module that is stored on the memories of two or more of the plurality of controller modules different from the determination target controller module, whether the fault occurs in the determination target controller module.

2. The information processing apparatus according to claim 1, wherein the plurality of controller modules includes a master module operating as a master controller module, a next master module operating as a next master controller module and a plurality of slave modules each operating as a slave controller module, and
    when determining whether or not the fault occurs in the master module, the next master module determines, based on the status information about the master module on the memory of the self controller module and the status information about the master module that is transmitted from each of the plurality of slave modules, whether the fault occurs in the master module or not.

3. The information processing apparatus according to claim 2, wherein the master module executes:
    a first updating process of updating the status information about the communication partner controller modules on the memory of the self controller module and/or the status information about the self controller module on the basis of an error type occurring during the communications with the communication partner controller modules;
    a second updating process of counting values of pieces of status information about each of the plurality of controller modules that are transmitted from the next master module and each of the plurality of slave modules to values of pieces of status information about each of the plurality of controller modules on the memory of the self controller module; and
    a first determining process of determining, based on the status information on the memory of the self controller module, whether the fault occurs in the plurality of slave modules or the next master module,
    each of the plurality of slave modules executes:
        the first updating process; and
        a first transmitting process of transmitting values of pieces of the status information about each of the plurality of controller modules on the memory of the self controller module to the master module if a value of the status information about any one of the plurality of slave modules or the next master module on the memory of the self controller module becomes equal to or larger than a second predetermined value smaller than a first predetermined value, and transmitting the value of the status information about the master module on the memory of the self controller module to the next master module if the value of the status information about the master module on the memory of the self controller module becomes equal to or larger than the second predetermined value, and
    the next master module executes:
        the first updating process;
        a second transmitting process of transmitting values of pieces of the status information about each of the plurality of controller modules on the memory of the self controller module to the master module if a value of the status information about any one of the plurality of slave modules or the self controller module on the memory of the self controller module becomes equal to or larger than the second predetermined value;
        a second updating process of counting the values of pieces of the status information about the master module that are transmitted from each of the plurality of slave modules to the value of the status information about the master module on the memory of the self controller module; and
        a second determining process of determining that the fault occurs in the master module if the value of the status information about the master module on the memory of the self controller module becomes equal to or larger than a third predetermined value.

4. The information processing apparatus according to claim 3, wherein each of the plurality of controller modules determines whether the self controller module is the master module, the next master module or one of the plurality of slave modules on the basis of pieces of identifying information and operation statuses of the plurality of controller modules and operates as the determined module.

5. The information processing apparatus according to claim 3, wherein the second determining process is a process of trying the communication with the master module if the value of the status information about the master module on the memory of the self controller module becomes equal to or larger than the third predetermined value, determining that the fault does not occur in the master module if succeeding in the communication and if a communication success count within a predetermined period is less than a predetermined count, and determining that the fault occurs in the master module if failing in the communication and if the communication success count within the predetermined period becomes equal to or larger than the predetermined count.

6. The information processing apparatus according to claim 3, wherein the next master module further executes a counting/managing process of counting and managing a reception count of the status information about the master module on a per slave module basis, and the second determining process is a process of determining whether or not the reception count about the plurality of slave modules, which is managed in the counting/managing process, becomes equal to or larger than "1" if the value of the status information about the master module on the memory of the self controller module becomes equal to or larger than the third predetermined value, and determining that the fault occurs in the master module limitedly to the case where the reception count about the plurality of slave modules becomes equal to or larger than "1".

7. The information processing apparatus according to claim 1, wherein the controller module counts values of pieces of status information about the determination target controller module that are stored on the memories of two or more of the plurality of controller modules different from the determination target controller module when each of the values of pieces of status information about the determination target controller module becomes equal to or larger than a predetermined value, and determines, based on a counted value of each of the values of pieces of status information about the determination target controller module, whether the fault occurs in the determination target controller module.

8. An information processing apparatus comprising:
a plurality of controller modules capable of performing communications with each other; and
a memory included in each of the plurality of controller modules to store status information with respect to communication partner controller modules in the plurality of controller modules and/or a self controller module, the status information reflecting a status of an error occurring during the communications with the communication partner controller modules,
wherein the plurality of controller modules includes a master module operating as a master controller module, a next master module operating as a next master controller module and a plurality of slave modules each operating as a slave controller module,
the master module executes:
a first updating process of updating the status information about the communication partner controller modules on the memory of the self controller module and/or the status information about the self controller module on the basis of an error type occurring during the communications with the communication partner controller modules;
a second updating process of counting values of pieces of status information about each of the plurality of controller modules that are transmitted from the next master module and each of the plurality of slave modules to values of pieces of status information about each of the plurality of controller modules on the memory of the self controller module; and
a first determining process of determining, based on the status information on the memory of the self controller module, whether the fault occurs in the plurality of slave modules or the next master module, each of the plurality of slave modules executes:
the first updating process; and
a first transmitting process of transmitting values of pieces of the status information about each of the plurality of controller modules on the memory of the self controller module to the master module if a value of the status information about any one of the plurality of slave modules or the next master module on the memory of the self controller module becomes equal to or larger than a second predetermined value smaller than a first predetermined value, and transmitting the value of the status information about the master module on the memory of the self controller module to the next master module if the value of the status information about the master module on the memory of the self controller module becomes equal to or larger than the second predetermined value, and the next master module executes:
the first updating process;
a second transmitting process of transmitting values of pieces of the status information about each of the plurality of controller modules on the memory of the self controller module to the master module if a value of the status information about any one of the plurality of slave modules or the self controller module on the memory of the self controller module becomes equal to or larger than the second predetermined value;
a second updating process of counting the values of pieces of the status information about the master module that are transmitted from each of the plurality of slave modules to the value of the status information about the master module on the memory of the self controller module; and
a second determining process of determining that the fault occurs in the master module if the value of the status information about the master module on the memory of the self controller module becomes equal to or larger than a third predetermined value.

9. The information processing apparatus according to claim 8, wherein each of the plurality of controller modules determines whether the self controller module is the master module, the next master module or one of the plurality of slave modules on the basis of pieces of identifying information and operation statuses of the plurality of controller modules and operates as the determined module.

10. The information processing apparatus according to claim 8, wherein the second determining process is a process of trying the communication with the master module if the value of the status information about the master module on the memory of the self controller module becomes equal to or larger than the third predetermined value, determining that the fault does not occur in the master module if succeeding in the communication and if a communication success count within a predetermined period is less than a predetermined count, and determining that the fault occurs in the master module if failing in the communication and if the communication success count within the predetermined period becomes equal to or larger than the predetermined count.

11. The information processing apparatus according to claim 8, wherein the next master module further executes a counting/managing process of counting and managing a reception count of the status information about the master module on a per slave module basis, and the second determining process is a process of determining whether or not the reception count about the plurality of slave modules, which is managed in the counting/managing process, becomes equal to or larger than "1" if the value of the status information about the master module on the memory of the self controller module becomes equal to or larger than the third predetermined value, and determining that the fault occurs in the master module limitedly to the case where the reception count about the plurality of slave modules becomes equal to or larger than "1".

12. An operation status monitoring method of monitoring operation statuses of a plurality of controller modules capable of performing communications with each other, the operation status monitoring method comprising:

storing, into a memory included in each of the plurality of controller module, status information with respect to communication partner controller modules in the plurality of controller modules and/or a self controller module, determining an error type when an error occurs during the communications with the communication partner controller modules, counting a value predetermined to update the status information corresponding to the determined error type, and determining, by a controller module in the plurality of controller modules, the controller module being different from a determination target controller module in the plurality of controller modules and determining whether or not a fault occurs in any controller module in the plurality of controller modules, based on status information about the determination target controller module that is stored on the memories of two or more of the plurality of controller modules different from the determination target controller module, whether the fault occurs in the determination target controller module.

* * * * *